(12) United States Patent
Sanchez et al.

(10) Patent No.: US 8,774,855 B2
(45) Date of Patent: Jul. 8, 2014

(54) METHOD TO ESTIMATE HEAD RELATIVE HANDSET LOCATION

(71) Applicant: Futurewei Technologies, Co., Plano, TX (US)

(72) Inventors: Jorge Fabrega Sanchez, San Diego, CA (US); Kiran Vanjani, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/673,835

(22) Filed: Nov. 9, 2012

(65) Prior Publication Data

US 2014/0135058 A1    May 15, 2014

(51) Int. Cl.
*H04M 1/00*    (2006.01)
*H04W 88/02*    (2009.01)

(52) U.S. Cl.
CPC .................................... *H04W 88/02* (2013.01)
USPC ......................... 455/550.1; 455/405; 361/810

(58) Field of Classification Search
USPC ................... 455/456.3, 517, 574, 522, 414.1
See application file for complete search history.

(56) References Cited

U.S. PATENT DOCUMENTS

| 8,532,675 | B1* | 9/2013 | Pasquero et al. | 455/456.3 |
|---|---|---|---|---|
| 2001/0036813 | A1* | 11/2001 | Baker et al. | 455/69 |
| 2003/0108976 | A1* | 6/2003 | Braig et al. | 435/14 |
| 2004/0208333 | A1 | 10/2004 | Cheung et al. | |
| 2006/0019630 | A1* | 1/2006 | Sposato et al. | 455/406 |
| 2007/0069721 | A1 | 3/2007 | Honkura et al. | |
| 2010/0085724 | A1* | 4/2010 | Park et al. | 361/810 |
| 2010/0285759 | A1 | 11/2010 | Chung et al. | |
| 2010/0304757 | A1* | 12/2010 | Yoshioka | 455/456.1 |
| 2012/0299772 | A1 | 11/2012 | Shtrom et al. | |
| 2013/0040601 | A1* | 2/2013 | Oh | 455/405 |

FOREIGN PATENT DOCUMENTS

| CN | 1220525 A | 6/1999 |
|---|---|---|
| CN | 1774871 A | 5/2006 |
| CN | 1820179 A | 8/2006 |
| CN | 101834643 A | 9/2010 |
| CN | 201830328 U | 5/2011 |

OTHER PUBLICATIONS

"SAR Evaluation Report for iPhone," FCC OET Bulletin 65 Supplement C 01-01 IEEE STD 1528:2003, Compliance Certification Services (UL CCS), Report No. 11U13896-5B, Oct. 1, 2011, 95 pages.

(Continued)

*Primary Examiner* — Kashif Siddiqui

(74) *Attorney, Agent, or Firm* — Conley Rose, P.C.; Grant Rodolph; Nicholas K. Beaulieu

(57) ABSTRACT

In one embodiment, the disclosure includes an apparatus comprising a processor configured to estimate a position of a wireless communication device relative to a user's body part based on an output of at least one sensor, wherein the position is selected from a group comprising: a left side position, a right side position, and a front-facing position, and configure at least one wireless communication device setting based on the estimated position. In another embodiment, the disclosure includes a mobile device comprising at least one sensor, an antenna subsystem, a transceiver subsystem coupled to the antenna subsystem, and a processor coupled to the transceiver subsystem and the sensor, and wherein the processor is configured to determine that the mobile device is in use, obtain a tilt angle of the mobile device from the sensor, and estimate the mobile device location relative to a user's body using the tilt angle.

20 Claims, 8 Drawing Sheets

(56) References Cited

OTHER PUBLICATIONS

Caimi, F., et al., "Isolated Mode Antenna Technology," iMat, Skycross, Inc., Jan. 2008, 9 pages.
Li, W., et al., "Seven-Band Surface-Mount loop Antenna With a Capacitively Coupled Feed for Mobile Phone Application," Microwave and Optical Technology Letters, vol. 51, No. 1, Jan. 2009, pp. 81-88.
Su, S., et al., "Dual-Polarized Dual-Loop-Antenna System for 2.4/5 GHz WLAN Access Points," IEEE 2011, 5 pages.
Foreign Communication From A Counterpart Application, PCT Application No. PCT/CN2013/086846, International Search Report dated Jan. 23, 2014, 6 pages.
Foreign Communication From A Counterpart Application, PCT Application No. PCT/CN2013/086846, Written Opinion dated Jan. 23, 2014, 6 pages.
Foreign Communication From A Counterpart Application, PCT Application No. PCT/CN2013/086764, International Search Report dated Feb. 13, 2014, 6 pages.
Foreign Communication From A Counterpart Application, PCT Application No. PCT/CN2013/086764, Written Opinion dated Feb. 13, 2014, 5 pages.

* cited by examiner

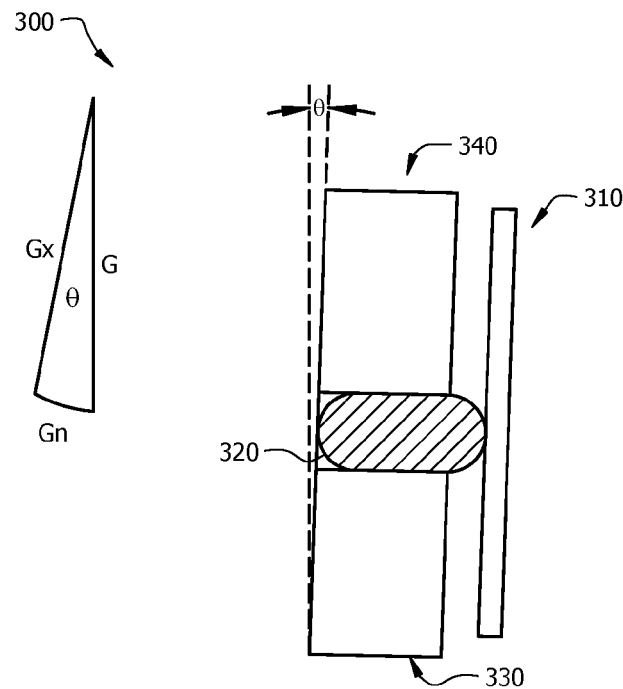
FIG. 4
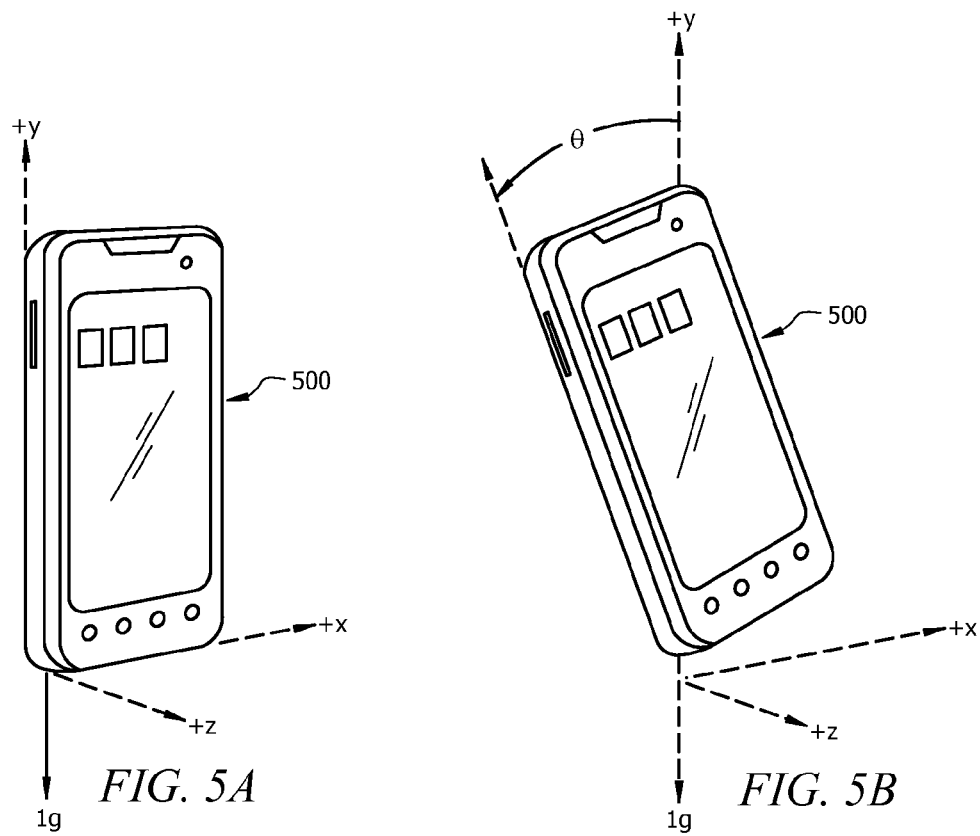
FIG. 5A
FIG. 5B

METHOD TO ESTIMATE HEAD RELATIVE HANDSET LOCATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advances in wireless communication have revolutionized the way we communicate and access information, and have birthed a number of wireless communication devices whose affordability and availability have increased over time. A number of modern wireless communication devices, such as mobile phones, personal digital assistant (PDA), wireless routers, hand-held tablets, laptops, etc., use a variety of input/output (I/O) components and user interfaces. In fact, more and more I/O and transmission functionalities (e.g., global positioning system (GPS), wireless local area networks (WLAN or Wi-Fi), Bluetooth, cellular communication, etc.) are now being integrated into a single portable electronic device such as a smartphone. Many of the modern wireless communication systems utilize static I/O and user interface configurations.

SUMMARY

In one embodiment, the disclosure includes an apparatus comprising a processor configured to estimate a position of a wireless communication device relative to a user's body part based on an output of at least one sensor, wherein the position is selected from a group comprising: a left side position, a right side position, and a front-facing position, and configure at least one wireless communication device setting based on the estimated position.

In another embodiment, the disclosure includes a mobile device comprising at least one sensor, an antenna subsystem, a transceiver subsystem coupled to the antenna subsystem, and a processor coupled to the transceiver subsystem and the sensor, and wherein the processor is configured to determine that the antenna is mobile device is in use, obtain a tilt angle of the mobile device from the sensor, and estimate the mobile device location relative to a user's body using the tilt angle.

In a third embodiment, the disclosure includes a method of optimizing settings for a wireless communication device comprising configuring an initial system setting for a wireless communication device, determining that a wireless communication device is in use, estimating a position of a wireless communication device relative to a user's head using output from a sensor, and reconfiguring the wireless communication device setting based on the estimated position.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 depicts an embodiment of an accelerometer in a generally vertical orientation.

FIG. 5A depicts a wireless communication device in a generally vertical position.

FIG. 5B depicts a wireless communication device in position rotated along the z-axis.

DETAILED DESCRIPTION

Figure 1:
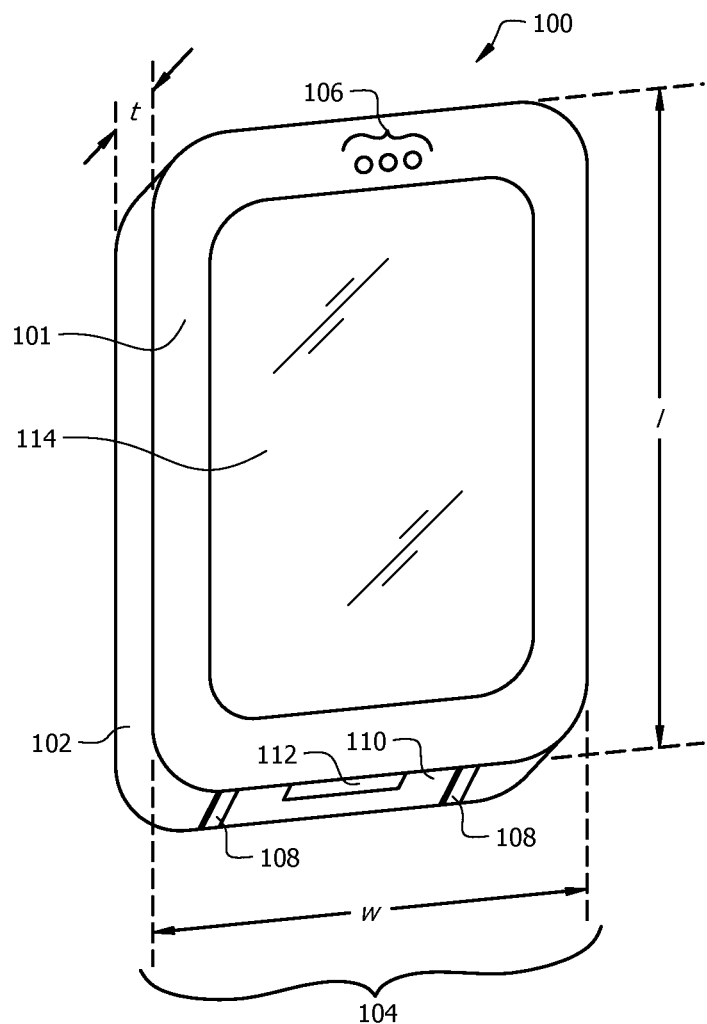
FIG. 1 is a front perspective view of an embodiment of a handheld wireless communication device.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for estimating a head-relative handset location for a wireless communication device. As used herein, the phrase "head-relative" may have the meaning of identifying a particular side of a user's head, e.g., left side or right side, at which the handset is located. Systems and methods may use sensor technology to determine orientations and/or aspects of the environment surrounding a wireless communication device, such as whether a wireless communication device is on the right of left side of a user's head. The systems and methods may be well suited for modern mobile wireless communication devices that are becoming more data centric with various screen sizes and form factors that in turn may provide differing operational characteristics based on their position with respect to a user's body and/or head-relative location. As used herein, the term 'data' may include computer-intelligible communications as well as voice communications, e.g., a voice telephone call. Once the position of the wireless communication device relative to the user's body part is known, the wireless communication device may be configured for a desired performance characteristic on a software and/or hardware level.

The system and method may be implemented in a wireless communication device used to transmit and receive radio frequency (RF) signals. The wireless communication device may be a handheld device, such as a cellular phone. The wireless communication device may be equipped with multiple-axis (multiple-dimension) input systems, such as a display, a keypad, a touch screen, an accelerometer, a gyroscopic sensor, a Global Positioning System (GPS), a microphone, and/or a wireless interface (e.g., a Wi-Fi connection).

This disclosure discusses various embodiments for the method to estimate the position of a wireless communication device relative to a user's body in the context of head-relative positions and cellular telephones by way of example and not of limitation. For example, the wireless communication device may comprise various types of handheld or personal devices, such as portable two-way radio transceivers (e.g., a "walkie-talkie"), cellular telephones, tablet computers, personal digital assistants (PDAs), dictaphones, global positioning system units, garage door openers, wireless computer mice, wireless keyboards, wireless computer accessories, television remote controls, wireless keys, and cordless telephones. Similarly, while the reference to the "head" relative position is used for convenience, any body part, e.g., hand, leg, etc., may be substituted as needed for a base of reference. A person having ordinary skill in the art would recognize that implementing the disclosed method in any other type of wireless communication device and using another anatomical frame of reference is within the scope of this disclosure.

FIG. 1 is a front perspective view of an embodiment of a handheld wireless communication device 100. The wireless communication device 100 may comprise a housing 101. The housing 101 may be a casing that forms the external surface of the wireless communication device 100, and comprise a plurality of edges 102 along a perimeter of the wireless communication device 100. The edges 102 may include a bottom edge 104, two side edges, and a top edge opposite to the bottom edge 104. The bottom edge 104 may comprise a conductive strip 110. The conductive strip 110 may comprise an external portion of the device's antenna, which may comprise an external portion and an internal portion. The wireless communication device 100 may also comprise one or more I/O ports 112 that may be located on one external surface, e.g., along the edges 102, and one or more I/O apertures 106 on a front panel 114, and 108 on an edge 102 of the device. The apertures 106 and 108 may support one or more speakers or microphones (not shown) that may be located inside the wireless communication device 100. The front panel 114 may comprise a touch screen panel and, optionally, a plurality of input buttons (e.g., a QWERTY keyboard). One or more input buttons (not shown) may be located on the edges 102 as well.

The shape of the housing 101 may vary according to the different designs, e.g., for different device types and/or manufacturers. The shape may be any three-dimensional shape, but is generally rectangular or cuboid. In one embodiment, the housing 101 may have a generally rectangular cuboid shape with rounded corners. The dimensions of the housing 101 may also vary. In one embodiment, the generally cuboid shape may have a thickness (t) of about 10 millimeters, length (l) of about 110 millimeters, and width (w) of about 60 millimeters. In other embodiments, the dimensions of the housing 101 may have different values but with similar ratios as above or with different ratios. For instance, the shape of the housing 101 may be longer, wider, or thicker in comparison to the dimensions above for t, l, and w. The housing 101 may be made out of various materials, which may include plastic, fiber glass, rubber, and/or other suitable materials. For portable electronics, high-strength glass, polymers, and/or optionally light-weight metals (such as aluminum) may be used as part of the housing 101 to reduce the overall weight of the device. If the front panel 114 is a touch screen panel, a polymer (such as poly(methyl methacrylate)) or high-strength glass with conductive coating may be used in the housing 101. One or more antennas may be located around the edges 102 and may be made of conductive material suitable for RF signal radiation, such as metallic material, as described in more detail below.

Figure 2:
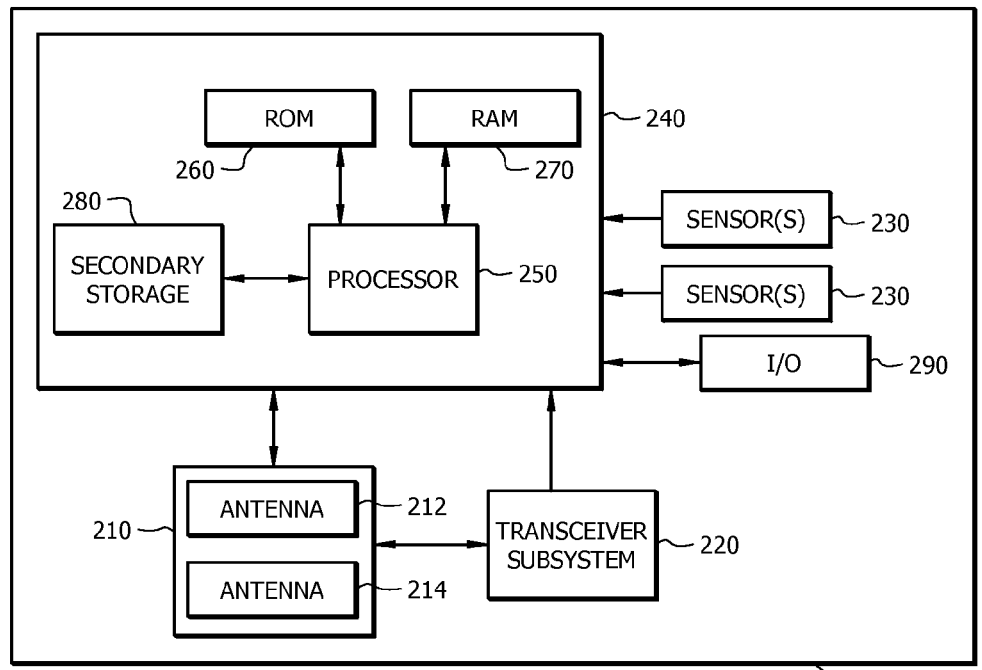
FIG. 2 is a schematic diagram of an embodiment of a wireless communication device.

FIG. 2 is schematic showing certain components comprising an embodiment of a wireless communication device 200, for example, wireless communication device 100 of FIG. 1. The wireless communication device may be a wireless phone, such as a cell phone or smart phone, or a tablet computer as examples. The wireless communication device 200 comprises an antenna subsystem 210 having antennas 212 and 214, a transceiver subsystem 220, one or more sensors 230, a processing unit 240, a processor 250, a read only memory (ROM) 260, a random-access memory (RAM) 270, a secondary storage 280, and an I/O 290 configured as shown in FIG. 2.

The antenna subsystem 210 may comprise an antenna 212 and an antenna 214, and may further comprise a switch (not depicted) for selecting between antennas 212 and 214. Antennas 212 and 214 may comprise any type of antennas that converts radio waves to electrical signals when in receive mode and that converts electrical signals to radio waves when in transmit mode, e.g., the antenna around edges 102 of FIG. 1. The antenna subsystem 210 may comprise one antenna or multiple antennas and may be coupled to the transceiver subsystem 220. In some embodiments, the antennas 212 and/or 214 may operate, for example, at one or more frequencies within the range of 824 and 2690 megahertz (MHz). However, the embodiments disclosed herein are not limited to these frequencies, but may be implemented to operate at other frequencies as well.

The transceiver subsystem 220 may be a system that transmits digital information to and receives digital information from antenna subsystem 210 via electrical signals. The electrical signals may be centered at a specific RF, such as 1700 MHz or 2200 MHz. The transceiver subsystem 220 may comprise components for extracting digital data from an analog signal, such as a local oscillator, a modulator, and channel coder for transmission and a local oscillator, a demodulator, and channel decoder for reception. Some of these components may be implemented in a baseband processor within the transceiver subsystem 220.

The processing unit 240 may be configured to receive inputs from transceiver subsystem 220, sensors 230, and I/O 290, and control a configuration of the antenna system 210, such as selecting between the antennas 212 and 214 therein. The processing unit 240 may be a separate unit from a baseband processor or may be a baseband processor itself. The processing unit 240 may include a processor 250 (which may be referred to as a central processor unit or CPU) that is in communication with memory devices including secondary storage 280, ROM 260, and RAM 270. Processor 250 may implement one or more steps similar to those in method 700 for estimating a head-relative handset location. The processor 250 may be implemented as one or more central processing unit (CPU) chips, or may be part of one or more application specific integrated circuits (ASICs) and/or digital signal processors (DSPs). The processor 250 may access ROM 260, RAM 270, and/or secondary storage 280, which may store head-relative handset location information for a wireless communication device, to determine a desired executional configuration based on information received from n sensors, such as sensors 230.

One or more sensors 230 may be configured for determining an orientation and/or an environment of the wireless communication device 200. The orientation may be a tilt or rotation relative to a vertical direction, and the environment may be an indoor or outdoor environment, as examples. The sensors 230 may include one or more accelerometers, magnetometers, gyroscopes, tilt sensors, other suitable sensors for measuring angular orientation, a proximity sensor, or any combination or permutation thereof. Proximity sensors are well known and include optical, capacitive, ultrasonic or other proximity sensors. Example sensors are described in further detail below. The sensors 230 and transceiver subsystem 220 may be coupled to a processing unit 240 as shown in FIG. 2.

Figure 3:
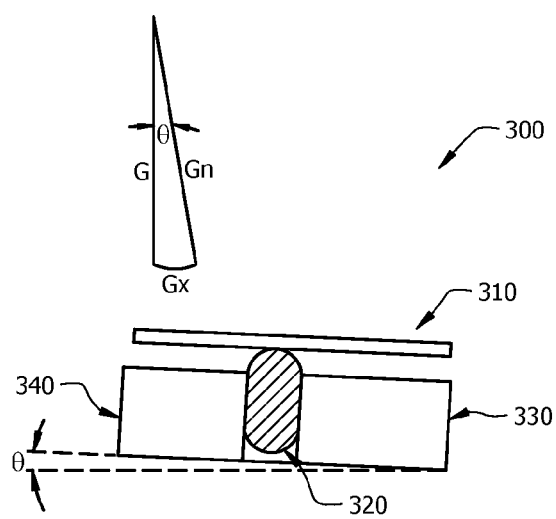
FIG. 3 depicts an embodiment of an accelerometer in a generally horizontal orientation.

FIG. 3 illustrates one orientation of an embodiment of a single axis accelerometer 300, such as may be implemented in wireless communication device 200 as a sensor 230 in FIG. 2. FIG. 4 illustrates a second orientation of an embodiment of a single axis accelerometer. An accelerometer is a device that measures a proper acceleration. A proper acceleration measured by an accelerometer is not necessarily a coordinate acceleration (i.e., a rate of change of velocity). Rather, it may be an acceleration associated with the phenomenon of weight experienced by any test mass at rest in a frame of reference of the accelerometer device. Referring to FIG. 3, accelerometer 300 may comprise a plate 310 that presses against a mass of insulating material 320, wherein the mass of insulating material 320 may be sandwiched between two other materials 330 and 340. The direction of gravity (G) is illustrated in FIGS. 3 and 4. When flat, the accelerometer 300 may be considered to be in a "+1G" orientation horizontally (i.e., where the detection axis of the accelerometer 300 is aligned with the direction of gravity), and in the "0G" orientation vertically (i.e., where the detection axis of the accelerometer 300 is orthogonal to the direction of gravity). If the accelerometer 300 is at rest relative to the Earth's surface, the accelerometer 300 of FIG. 3 having an angle of rotation θ may register less than +1G in the horizontal axis and more than 0G in the vertical axis. The angle of rotation θ may be computed as $G_n = G*Cos(\theta)$. When vertical, the accelerometer 300 may be considered to be in a "0G" orientation vertically (i.e., where the detection axis of the accelerometer 300 is orthogonal to the direction of gravity), and in the "0G" orientation horizontally (i.e., where the detection axis of the accelerometer 300 is aligned with the direction of gravity). If the accelerometer 300 is at rest relative to the Earth's surface, the accelerometer 300 of FIG. 4 having an angle of rotation θ may register less than +1G in the vertical axis and more than 0G in the horizontal axis. The angle of rotation θ may be computed as $G_n = G*Sin(\theta)$. Basically, the single axis accelerometer at rest will measure a projection of the g-force on the specific axis. A three-axis accelerometer may measure a projection of $G_n$ on each axis. Given the projection along three orthogonal axes, a device orientation may be determined.

FIG. 5A depicts a wireless communication device 500 having a vertical orientation with respect to the y-axis, which may generally be referred to as portrait mode. FIG. 5B depicts the wireless communication device 500 of FIG. 5A rotated about the z-axis, i.e., deviated θ degrees with respect to the y-axis of FIG. 5A. The wireless communication device 500 may be the wireless communication device 200 of FIG. 2. In one embodiment, the wireless communication device 500 includes one sensor, for example, accelerometer 300 of FIG. 3, for detecting changes in angular orientation along a single axis. In another embodiment, the wireless communication device 500 includes a plurality of sensors for detecting changes in angular orientation along one or more axis.

Figure 6A:
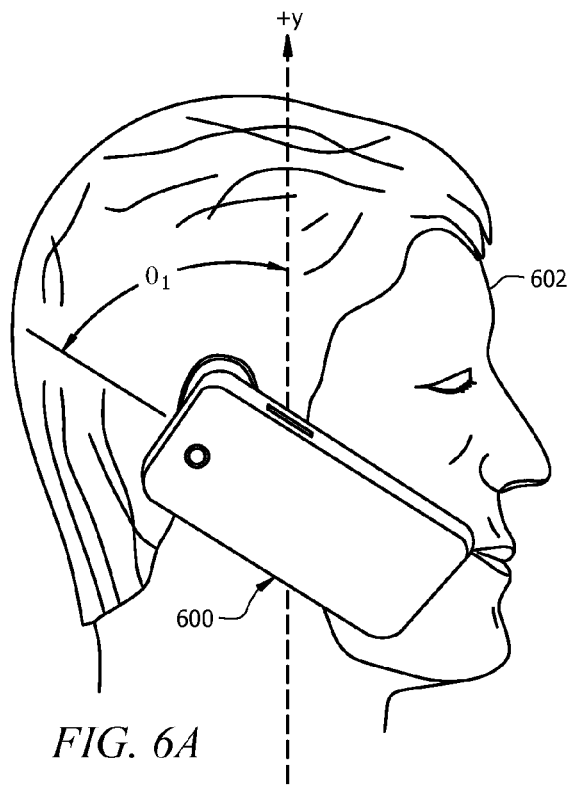
FIG. 6A depicts a wireless communication device in a right-side natural use position.
Figure 6B:
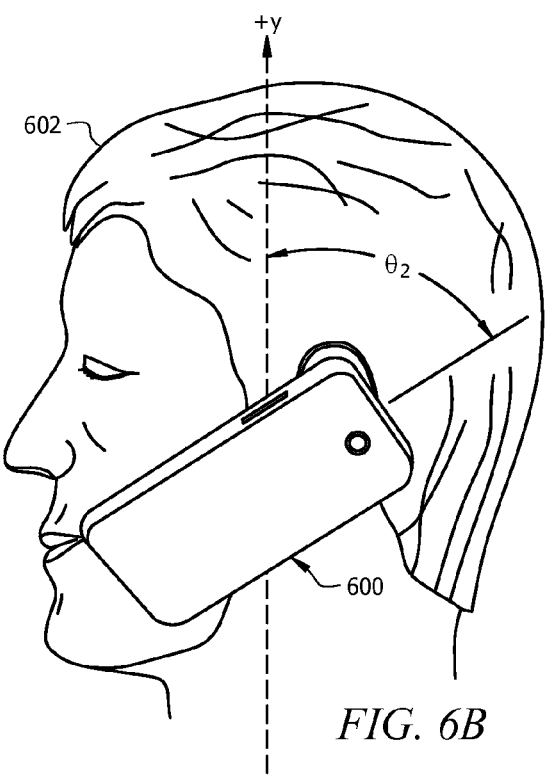
FIG. 6B depicts a wireless communication device in a left-side natural use position.

FIG. 6A depicts a wireless communication device 600 proximate to the right side of a head 602 at an angle $\theta_1$ with respect to the y-axis. The wireless communication device pictured in FIG. 6A may have measured X, Y, and Z G values of 0.91, 0.29, and −0.13, respectively. FIG. 6B depicts a wireless communication device 600 proximate to the left side of a head 602 at an angle $\theta_2$ with respect to the y-axis. The wireless communication device pictured in FIG. 6B may have measured X, Y, and Z G values of −0.91, −0.42, and −0.05, respectively. FIGS. 6A and 6B show a wireless communication device 600, for example, the wireless communication device 500 of FIGS. 5A and 5B, in a position such that a speaker (not shown) on the wireless communication device 500, for example, accessible via the apertures 106 of FIG. 1, is positioned proximate to the ear and a microphone (not shown), for example, accessible via apertures 108 of FIG. 1, is positioned proximate to the mouth. For ease of reference and without limitation, positions depicted in FIGS. 6A and 6B, including a range of positions wherein the wireless communication device 600 is proximate to a user's head and has a centerline generally running from about the user's ear to about the user's mouth when the user's head is in a generally vertical position, may be referred to herein as the natural use position.

Figure 7:
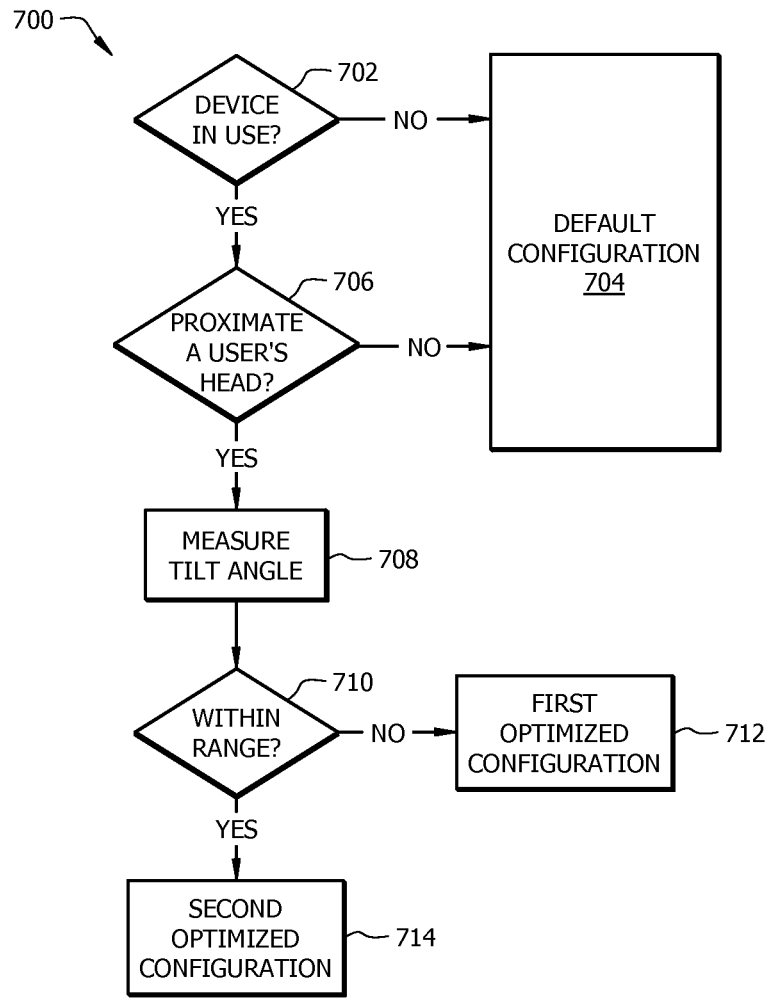
FIG. 7 depicts a flowchart of an embodiment of a method for estimating head-relative handset location.

FIG. 7 is a block diagram depicting an embodiment of a method to estimate head-relative handset location. The method 700 may begin at step 702 by determining whether the wireless communication device, such as the wireless communication device 600 of FIGS. 6A and 6B, is in use, e.g., on a voice telephone call. If the wireless communication device is not in use, a default configuration 704, also referred to herein as an initial configuration, may be initiated. For example, the default configuration 704 may include a software and/or hardware configuration suitable for carrying the wireless communication device in a carrying position, e.g., in a pocket, briefcase or backpack, and for another example, the default configuration 704 may also include a software and/or hardware configuration suitable for that case in which the device is in use but the devices is not proximate to a user's head. Alternately, the default configuration 704 may specify a software and/or hardware configuration to which the wireless communication device may automatically revert when the wireless communication device is not in use. If the wireless communication device is in use, at step 706 the method 700 may verify that the wireless communication device is proximate to a user's head. In one embodiment, the method verifies that the wireless communication device is in use on a voice telephone call and proximate to a user's head by verifying that a proximity sensor, e.g., a sensor 230 of FIG. 2, is 'on', that the touchscreen, the LCD, the Bluetooth headset (HSP) and/or handsfree (HFP) are 'off', that a speakerphone function is not activated, and/or that a headset is not physically connected to the wireless communication device. If step 706 determines that the wireless communication device is not proximate to a user's head, the default configuration 704 may be initiated. If step 706 determines that the wireless communication device is proximate to a user's head, at step 708 one or more sensors, e.g., an accelerometer 300 of FIG. 3, may be utilized to determine two or three dimensional tilt angle of the wireless communication device. The one or more sensors may be configured to monitor tilt angle either continuously or upon a trigger condition, e.g., the wireless communication device is determined to be both in use and proximate to a user's head. At 710, the measured tilt angle may be evaluated to determine whether the measured tilt angle occupies a predetermined range. In one embodiment, the tilt angle may be measured according to FIGS. 6A and 6B. If the measured tilt angle does not occupy the predetermined range, a first optimized configuration 712 may be initiated. For example, the first optimized configuration 712 may correlate to a right-side natural use position. If the measured tilt angle does occupy the predetermined range, a second optimized configuration 714 may be initiated. The second optimized configuration 714 may correlate to a left-side natural use position. In an embodiment, the first optimized configuration 712 and the second optimized configuration 714 may be configured or set before determining the measurement of tilt angle and selecting the first optimized configuration 712 or the second optimized configuration 714. In another embodiment, the device may configure and set the device setting after the measurement of the tilt angle is determined.

In some embodiments, either the first or the second optimized configuration 712 may be the same as the default configuration 704. In some embodiments, the device setting includes software and/or hardware configurations (e.g. the antenna configuration, and/or speaker configuration, etc.) suitable for the specific position, e.g. the left-side position, right-side position, or the front-facing position. For example, the device setting may be the volume setting of a speaker, the default setting may correspond to a first volume setting for the speaker, the first optimized setting may correspond to the same first volume setting, and the second optimized configuration may correspond to a second volume setting. The device setting for the various configurations (e.g., the first a second optimized configuration, or a second optimized configuration) correlated to the corresponding positions may be implemented automatically by the device, or may be implemented via user input or selection. In yet another embodiment, a second measured tilt angle is evaluated and the first, second or default configuration is selected as appropriate based on the evaluation. While only two optimized configurations are depicted in FIG. 7, as will be understood by one of ordinary skill, the method is not so limited and may include three or more optimized configurations. For example, the front-facing position may be accounted for by a third optimized configuration.

As an embodiment, at least one of the first optimized configuration 712 and the second optimized configuration 714 may include I/O configurations suitable to the identified natural use position. In one embodiment, the first optimized configuration 712 modifies the audio gain tables to output audio at a louder setting than the second optimized configuration 714, e.g., to account for a user's hearing impairment, if the wireless communication device has been so configured. In another embodiment, the first optimized configuration 712 utilizes a first microphone proximal to a user's mouth for audio input and a second microphone distal to a user's mouth for noise cancellation monitoring and compensation. In still another embodiment, the natural use position may cause the wireless communication device to select one of two identical antennas, e.g., antennas 212 and 214 of FIG. 2, on opposite sides of a wireless communication device for optimized in-use transmissions, wherein the first antenna corresponds to an optimized right side use configuration and the second antenna corresponds to an optimized left side use configuration. In yet another embodiment, the natural use position may correspond to a dual-hand or front-facing natural use texting position, with antenna use optimized according to a third optimized configuration. Such texting embodiments may require tilt angle measurement along a second or third axis and may be configured to disallow texting while driving. For example, if the wireless communication device receives further indication, e.g., GPS signals, velocity sensing signals, etc., that the wireless communication device is in a moving car, texting features may be disallowed. Various other software and/or hardware configurations will be apparent to those of skill in the art.

Figure 8:
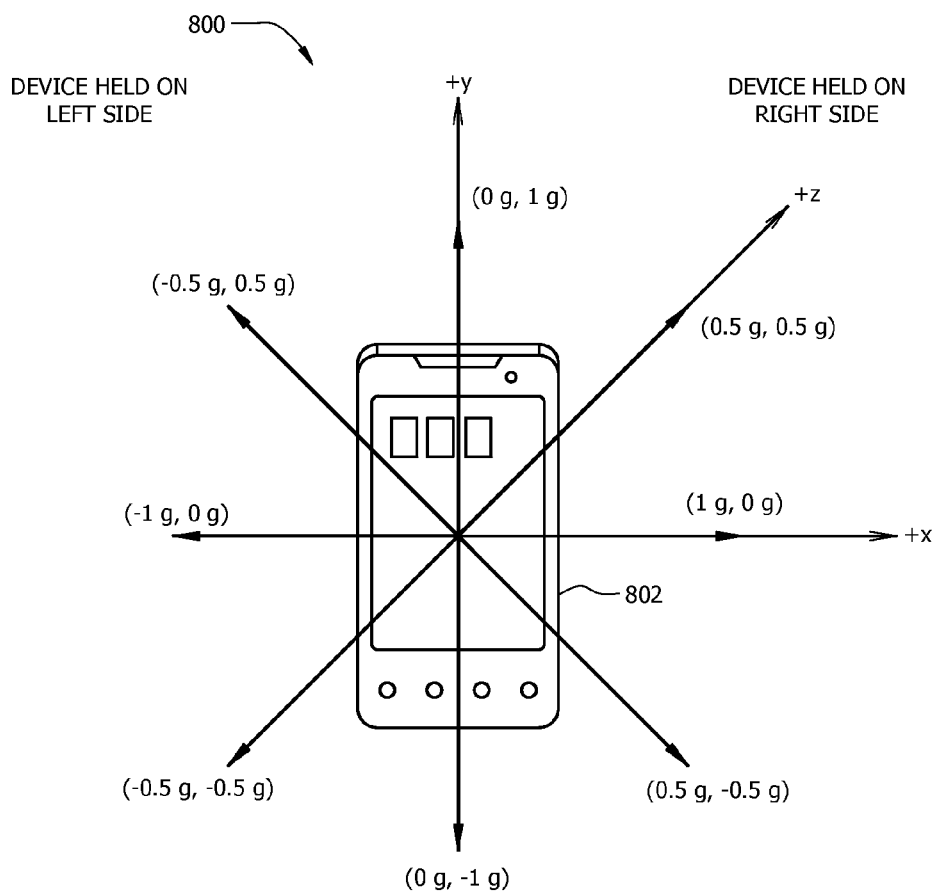
FIG. 8 graphically depicts an estimation map for an embodiment of a method for estimating head-relative handset location.

FIG. 8 depicts an example right/left side estimation map 800. Map 800 may be suitable for illustrative use with respect to determining tilt angle of a wireless communication device 802 based on accelerometer outputs, for example, at step 710 of FIG. 7. The wireless communication device 802 may be the wireless communication device 600 of FIGS. 6A and 6B. A positive first coordinate value may indicate that the wireless communication device 802 is oriented to a right-side natural use position. A negative first coordinate value may indicate that a wireless communication device 802 is oriented to a left-side natural use position.

Figure 9A:
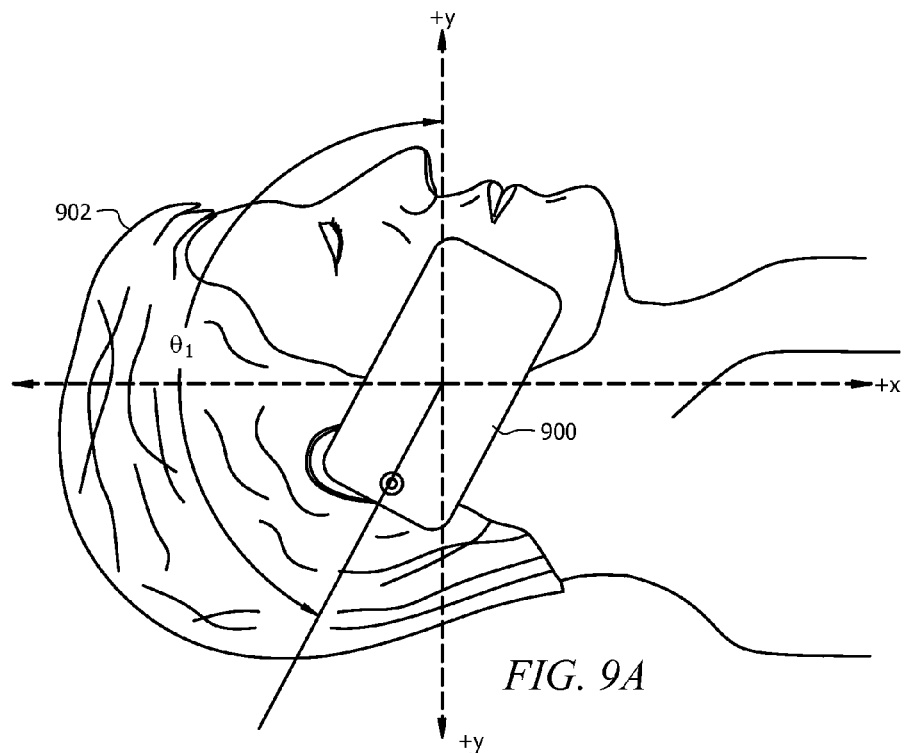
FIG. 9A depicts a wireless communication device in a right-side atypical use position.
Figure 9B:
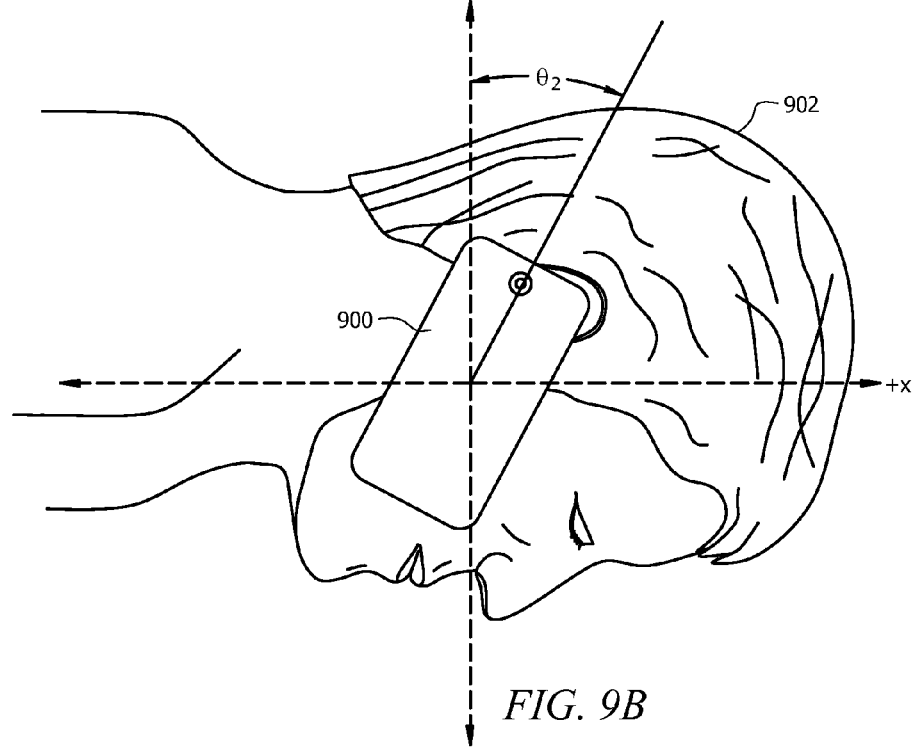
FIG. 9B depicts a wireless communication device in a right-side atypical use position.

FIGS. 9A and 9B depict atypical use cases which may be considered when determining the exact parameters for coordinate value assignment, e.g., such as the values of estimation map 800, for purposes of entering into a particular optimized software and/or hardware configuration, e.g., optimized configurations 712 and 714 of FIG. 7. FIG. 9A depicts a wireless communication device 900 proximate to the right side of a head 902 at an angle $\theta_1$ with respect to the y-axis. The wireless communication device pictured in FIG. 9A may have measured X, Y, Z and total field G values of 0.38, 1.00, −0.07 and 1.07, respectively, correctly correlating to a right-side natural use position. FIG. 9B depicts a wireless communication device 900 proximate to the right side of a head 902 at an angle $\theta_2$ with respect to the y-axis. The wireless communication device pictured in FIG. 9B may have measured X, Y, Z and total field G values of −0.33, −0.83, 0.18 and 0.91, respectively, incorrectly correlating to a left-side natural use position. In some embodiments, the atypical use cases are deemed acceptable errors and no special protocols, methods, mechanisms or procedures are used to accommodate such cases. In other embodiments, the atypical use cases are accounted for by including an error band, e.g., a region of about ±5° to ±45° off vertical wherein the wireless communication device may be read as having a head-relative location opposite the use position indicated by the remainder of its estimation map hemisphere. In still other embodiments, the atypical use cases are accounted for by recording prior readings, comparing current measurements to prior readings, and disallowing transition between natural use positions under certain conditions, e.g., by disallowing transitions which pass through 180°. Other methods for accounting for atypical use cases will be readily apparent to those of skill in the art.

In other embodiments, the head-relative handset position is stored either locally or at a third-party repository for purposes of statistical analysis. In some embodiments, a third party uses the statistical analysis for purposes of design of software and/or hardware. In other embodiments, the wireless communication device uses the statistical analysis to locally create more accurate or customized usage parameters for purposes of determining natural and atypical use positions.

Figure 10:
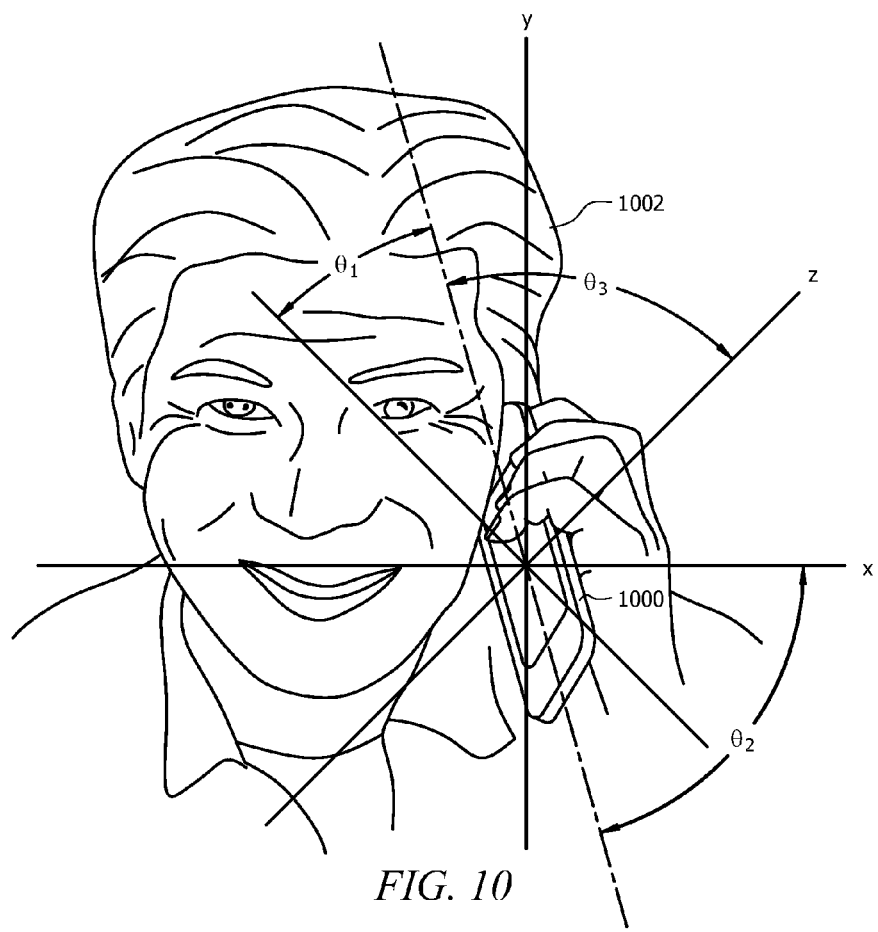
FIG. 10 depicts a wireless communication device in a left-side natural use position.

FIG. 10 depicts a wireless communication device 1000 proximate to the left side of a head 1002 at an angle $\theta_1$ with respect to the y-axis, $\theta_2$ with respect to the x-axis and $\theta_3$ with respect to the z-axis. Embodiments of the methods described herein may account for three dimensional orientation by utilizing one or more sensors, e.g., sensors 230 of FIG. 2, including, for example and not limitation, a plurality of accelerometers. In some instances, three dimensional mapping may be useful for increasing the accuracy or increasing the functionality of the method to estimate head-relative handset location. In other instances, hardware, software, operational, business, or environmental constraints may render measurement in only one axis desirable.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a processor configured to:
determine that a wireless communication device is in use by receiving indications that a voice telephone call is in progress, a speakerphone is not in use, a headset is not in use, and a handsfree device is not in use;
estimate a position of the wireless communication device relative to a user's body part based on an output of at least one sensor; and
configure at least one wireless communication device setting based on the estimated position.

2. The apparatus of claim 1, wherein the sensor is selected from a group consisting of a proximity sensor, an accelerometer, a gyroscope, a magnetometer, and a tilt sensor.

3. The apparatus of claim 1, wherein the body part is the head, and wherein the wireless communication device is configured to estimate the position and configure the setting while the wireless communication device is in use and the wireless communication device is proximate to the head.

4. The apparatus of claim 1, wherein configuring the setting comprises entering a first optimized configuration when the position is a left side position, a second optimized configuration when the position is a right side position, or a third optimized configuration when the position is a front-facing position.

5. The apparatus of claim 1, wherein one sensor is a proximity sensor for indicating that the wireless communication device is proximate to a user's head.

6. The apparatus of claim 1, wherein the wireless communication device setting is a setting of an input/output (I/O) device, and wherein the I/O device is selected from a group consisting of a speaker, a microphone, or an antenna.

7. A mobile device comprising:
at least one sensor;
an antenna subsystem, wherein the antenna subsystem comprises one or more antennas;
a transceiver subsystem coupled to the antenna subsystem; and
a processor coupled to the transceiver subsystem and the sensor, and wherein the processor is configured to:
determine that the mobile device is in use by receiving indications that a voice telephone call is in progress, a speakerphone is not in use, a headset is not in use, and a handsfree device is not in use;
obtain a tilt angle of the mobile device from the sensor; and
estimate the mobile device location relative to a user's body using the tilt angle.

8. The mobile device of claim 7, wherein determining that the mobile device is in use further comprises determining either that the antenna is communicating data or that a proximity sensor indicates that the mobile device is proximate to a user's head.

9. The mobile device of claim 7, wherein the sensor is selected from a group consisting of an accelerometer, a gyroscope, a tilt sensor, and a position sensor.

10. The mobile device of claim 7, wherein the processor is further configured to establish a first optimized configuration of the mobile device when the tilt angle provides data used to estimate that the mobile device is located on the right side of a user's body, or establish a second optimized configuration of the mobile device when the tilt angle provides data used to estimate that the mobile device is located on the left side of a user's body.

11. The mobile device of claim 10, wherein the mobile device is estimated to be located on the right side of a user's body when the tilt angle corresponds to a first predefined range, or the mobile device is estimated to be on the left side of a user's body when the tilt angle corresponds to a second predefined range.

12. The mobile device of claim 11, wherein the mobile device is estimated to be in a front-facing position with respect to a user's body when the tilt angle corresponds to a third predefined range.

13. A method of optimizing settings for a wireless communication device comprising:
   configuring an initial system setting for the wireless communication device;
   determining that the wireless communication device is in use by receiving indications that a voice telephone call is in progress, a speakerphone is not in use, a headset is not in use, and a handsfree device is not in use;
   estimating a position of the wireless communication device relative to a user's head using output from a sensor; and
   reconfiguring the wireless communication device setting based on the estimated position.

14. The method of step 13, further comprising:
   recording an output from the sensor;
   obtaining a subsequent output from the sensor;
   comparing the subsequent output from the sensor to the output to obtain a new position of the wireless communication device relative to the user's head; and
   performing a second reconfiguration of the wireless communication device setting based on the new position of the wireless communication device.

15. The method of claim 13, wherein the sensor is selected from a group consisting of a tilt sensor and a position sensor.

16. The method of claim 13, further comprising:
   recording an output from the sensor; and
   performing a statistical analysis to determine a user-specific natural use position.

17. The method of claim 13, wherein estimating a position of a wireless communication device comprises excluding erroneous atypical use measurements using an error band.

18. The method of claim 13, wherein reconfiguring the wireless communication device setting comprises selecting at least one of a speaker, a microphone, and an antenna.

19. The method of claim 13, wherein second reconfiguring the wireless communication device setting comprises selecting at least one of a speaker, a microphone, and an antenna.

20. The method of claim 13, wherein estimating the position of the wireless communication device relative to the user's head comprises estimating that the mobile device is located on the right or left side of a user's body according to an angle between the head centerline and the mobile device.

* * * * *